Patented Jan. 13, 1948

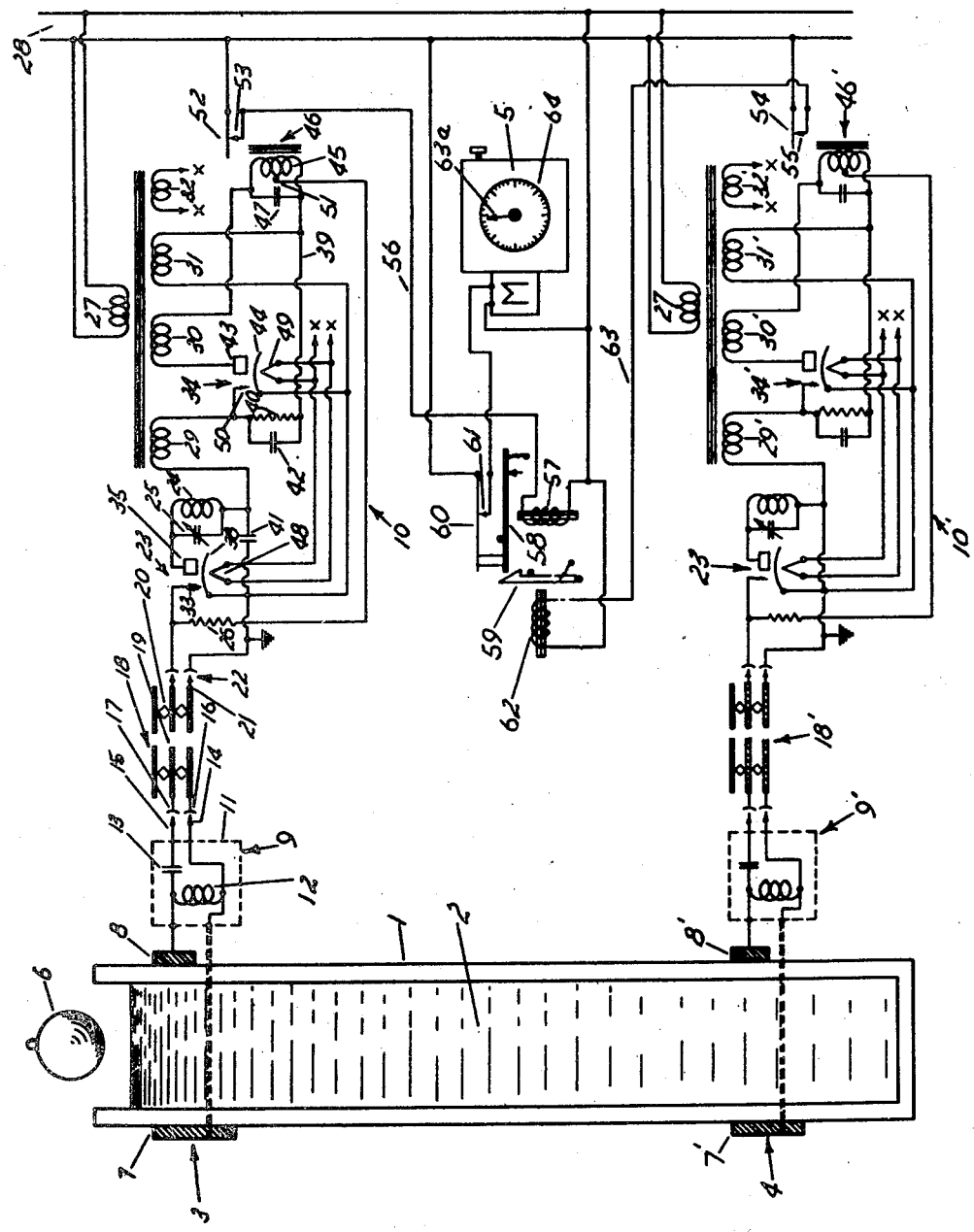

2,434,349

UNITED STATES PATENT OFFICE 2,434,349

VISCOSITY MEASURING APPARATUS

Theodore A. Cohen, Chicago, Ill., assignor, by mesne assignments, to Wheelco Instruments Company, Chicago, Ill., a corporation of Illinois Application February 26, 1943, Serial No. 477,292

3 Claims. (Cl. 161—18)

1

This invention relates to measuring apparatus in general and more particularly to an apparatus for measuring the viscosity of a liquid and has for its primary object the provision of an efficient and accurate apparatus for that purpose.

Other and further objects of this invention will become more apparent hereinafter as the same becomes better understood from an examination of the specification and drawings hereinafter referred to wherein there is shown in the single figure a schematic and diagrammatic view of an apparatus embodying this invention.

Referring to the drawings more particularly, reference character 1 designates a vertical narrow container for a liquid 2, the viscosity of which is to be measured.

Upper and lower impedance change devices 3 and 4, respectively, are mounted in vertically spaced predetermined positions upon the container 1 and are so connected to apparatus, to be hereinafter described, as to start and stop, respectively, a timing device 5 so that the time consumed by a ball 6, under the influence of gravity, in passing through the liquid 2 between said impedance change devices will be a measure of the viscosity of said liquid and said viscosity will be shown directly upon said timing device.

The upper impedance change device 3 comprises a pair of metal plates 7 and 8 shaped and mounted to fit laterally spaced positions on the container 1 at an adjustable vertical position thereon at which it is desired to commence the measured travel of the ball 6 through the liquid 2. The plates 7 and 8 act as plates of a condenser, the capacity of which is changed as the ball passes therebetween.

The plates 7 and 8 are connected to a self contained grid tank unit 9 for an oscillator circuit 10. This unit 9 is mounted in a suitable housing 11 and comprises an inductance coil 12 and condenser 13 and together with the plates 7 and 8 forms a resonating circuit with said plates connected to opposite ends of said coil and said condenser connected to one end of said coil. A pair of male plugs 14 and 15 are connected to one end of said coil 12 and to the condenser 13, respectively.

The male plugs 14 and 15 are adapted to connect with female connector elements 16 and 17, respectively, at one end of a concentric conductor cable 18 insulated from ground by an external rubber sheath or cover (not shown). The cable 18 comprises an inner conductor 19, separators 20 and an outer conducting sheath 21. The end of the cable opposite to the connector 14—17 is

2 provided with a connector 22 similar thereto for connection to the input of the oscillator circuit 10 hereinafter described.

The concentric co-axial conductor cable 18 is constructed in well known manner with its core conductor fixedly and concentrically positioned within the conducting sheath. By properly choosing the values of the capacitive and inductive components of the resonating circuit in enclosure 9, the cable is properly terminated so that minimum power losses are obtained in the system due to the cable for any substantial length thereof. In this manner the remote control assembly just described may control the oscillator apparatus 10 hereinafter described, without fear of transmission losses which otherwise would reduce the sensitivity of the apparatus.

The oscillator circuit includes a vacuum tube 23 connected to a plate tank comprising an inductance 24, variable condenser 25 for tuning to resonance, as will be hereinafter described, and grid bias resistor or grid leak 26 for said tube.

Alternating current voltages are obtained from a multi-winding transformer having a primary winding 27, connected to a suitable source of alternating current such as line 28 and having a plurality of secondary windings 29, 30, 31 and 32 arranged to supply suitable voltages to the tube circuits. The tube 23 and repeater tube 34, hereinafter described, are self rectifying and therefore the operation will be described only with respect to the positive half cycles of the alternating current voltages.

The output circuit of the tube 23 may be traced from the left-hand terminal of the secondary winding 29 through the plate tank circuit 24, 25, the anode or plate 35, the cathode 38, the secondary winding 31, the conductor 39, a load impedance or resistor 40 and thence to the right hand terminal of secondary winding 29. Bypass condensers 41 and 42 are connected as shown and prevent the flow of high frequency and oscillatory currents through the transformer windings and through the load impedance 40. The total voltage impressed across the anode circuit of the tube 23 is the sum of the voltages of the secondary windings 29 and 31.

The output circuit for the repeater or amplifier tube 34 may be traced from the left-hand terminal of the secondary winding 30 to the anode or plate 43, the cathode 44, the secondary winding 31, the voltage of which is in phase with the voltage of the winding 30, the operating winding 45 of the relay 46 and to the right hand terminal of the winding 30. A condenser 47 is connected as shown across the relay winding 45 and prevents chatter of the relay by supplying energy to it during the negative or non-conducting portion of an A. C. cycle. Transformer secondary winding 32 is connected to filaments 48 and 49 to heat cathodes 38 and 44, respectively, by wires x—x not completed. The grid bias for effecting proper operation of the repeater tube 34 is obtained by connecting the grid or control electrode 50 to one end of the load resistor 40, the remaining portion of this circuit extending from the cathode 44 to the secondary transformer winding 31, and the conductor 39 to the opposite end of the load resistor 40. It will be apparent that the voltage across the winding 31 is opposite to and thus compensates for a portion of the voltage drop across the load impedance 40 and accordingly when the oscillator tube 23 is in oscillatory condition so that a plate current of low value flows through the load impedance 40, a minimum negative bias equal to the difference between the voltage of the winding 31 and the voltage drop across the load impedance 40 is impressed on the grid 50. Under these conditions, and with proper voltages, the tube constants, and the value of the load resistance, all so prechosen as to provide a low negative grid bias, a high repeater plate current is obtained for proper operation of the relay.

A regenerative coupling is provided between the grid circuit of the tube 23 and the output of the repeater tube 34, as shown. The grid circuit for the oscillator tube 23 extends from the cathode 38, the transformer winding 31, the lower end of relay winding 45, the tap 51 and the grid bias resistor or grid leak 26 to the grid 33.

A fixed grid bias is applied, by the above circuit, to the grid 33 which is equal to the voltage drop across the relay winding 45 to tap 51 and is so chosen that with maximum current flowing in the output circuit of the amplifier or repeater tube 34 the maximum desired negative bias is applied to the grid 33.

The plate tank is tuned to predetermined resonance with condenser 25 so as to energize relay 46 when the ball 6 reaches a prechosen position between the plates 7—8 of the pick-up device 3.

When the relay 46 is energized the contacts 52 and 53 are closed to start the operation of the timing device 5 as will be hereinafter described. When the ball is within the impedance change device or clip 3 between the plates 7 and 8 the oscillator circuit is tuned and the oscillator plate current drops, decreasing the drop across resistor 40, which decreases the negative bias on the amplifier tube 34; the plate current of the amplifier increases, increasing the drop across the relay 46, which increases the negative bias on the grid of the oscillator 23, aiding in dropping the oscillator plate current, which further tends to decrease the bias upon the amplifier 34, etc., with the result that the final magnitude of the plate current of amplifier 34 is at saturation. By the judicious choosing of load resistance 40, of the resistance of the relay winding 45 and the proper apportioning of bias voltages as shown, the values of plate current between cut-off and saturation may be fixed at any desired value. The result is that large, abrupt, and rapid plate current changes are always obtained. The result obtainable is comparable to the triggering off of a "Thyratron" type hot cathode grid control rectifier without the necessity of using gas filled tubes.

Study of the circuit arrangement will also bring out that the system is self compensating for changes in line voltage which prevents shifting of the control point if the line voltage should change.

It is not necessary that the apparatus be limited to the use of separate vacuum tubes, each containing separate triode elements, since these separate tubes have been chosen only as a matter of convenience. Dual purpose tubes having triode elements in a common envelope may be operated in the same manner. Direct current voltages may also be used.

It will be noted that the plate supply for tubes 23 and 34 is obtained from winding 29 and 30, respectively, in series with 31. Should the line voltage fall the supply voltage from 30 would reduce and therefore the plate current flow in the plate circuit of tube 34 would tend to decrease. However, since winding 29 supplies the plate circuit of tube 23 and since the negative bias on grid 50 is obtained from the drop across resistor 40 due to plate current flow in the plate circuit of tube 23, the plate current of tube 23 is also reduced with reduction of voltage from 29. Therefore the negative bias on grid 50 is reduced keeping the plate current flow in the plate circuit of the tube 34 substantially constant. The reverse result is obtained with rise in line voltage. This self compensating feature is important in electronic control apparatus since it prevents shift of the control point or level upon changes in line voltage. Ageing of tubes is also compensated for in the same manner in conjunction with the regenerative connection between tap 51 and resistor 26.

In summary, the advantages of this circuit are manifest, inasmuch as a relay with a high throwout percentage is not necessary, since the plate current changes through said relay are very rapid and very large. It is impossible to lose control of the oscillator, since, because of the fact that it is self-rectified, oscillations, no matter how minute, will always reoccur. Other modifications of this circuit will readily occur to those versed in the art, such as the use of a common power supply, with a self-rectified circuit, instead of separate voltages as shown. Such circuits have been designed and are entirely feasible. The one shown being one of a family of such circuits and being chosen as the most descriptive of the above-explained operation.

When the ball 6 has passed the impedance change device 3, the oscillator circuit is detuned, causing its plate current to rise sharply, increasing the voltage drop across the resistor 40, which correspondingly increases the negative bias upon the amplifier tube 34 with a consequent drop in its plate current through the relay 46. The decrease in current through the relay 46 causes a decrease in the negative bias applied to the grid of the oscillator tube 23, which tends to further increase the plate current of the oscillator tube 23. This increase in the oscillator plate current further increases the voltage drop across the load resistor 40 and the negative bias upon the amplifier tube 34 with the consequent effect of rapidly dropping the amplifier plate current level to the cut-off point, which causes approximately zero level in the plate current and deenergizing of the relay to open contacts 52 and 53.

The lower impedance change device 4 is mounted at the adjustable vertical position on the container 1 at which it is desired to end the measured travel of the ball 6 through the liquid 2 and is identical with 3 previously described and it is connected in exactly the same manner to a grid tank unit 9' which is substantially the same as the grid tank unit 9. Likewise the grid tank unit 9' is connected through a concentric conductor cable 18' to an oscillator circuit 10' similar to cable 18 and circuit 10, respectively. Circuit 10' contains tubes 23' and 34' and a relay 46' energized by transformer coils 27'—32' in the same manner as in the previous circuit 10. As the ball 6 enters the device 4 it tunes the circuit 10' and energizes the relay 46' causing the closing of relay contacts 54 and 55 and as the ball 6 leaves the device 4 the circuit 10' is detuned causing the deenergizing of relay 46' and the opening of said contacts operating in the same manner as the previous circuit.

The relay contacts 52 and 53, controlled by relay 46 and the upper impedance change device 3, are in circuit with a conductor 56 leading from one side of line 28 to a relay 57 and thence to the other side of the line whereby the latter relay is energized when said contacts are closed upon the energization of the former relay. The relay 57 is provided with an armature 58 which engages a spring latch 59 which locks said armature and a switch 60 attached thereto in closed position. Switch 60 and a contact 61 therefor are in circuit with a driving motor M for the timing device 5 so that when said circuit is closed by the closing of switch 60 said timing device, which is like a stop watch, starts and when said switch opens said device stops.

The spring latch 59 is actually the armature of a relay 62 which is in circuit with a conductor 63 containing contacts 54 and 55 of the relay 46' whereby said latch will be actuated to release armature 58 of relay 57 to open switch 60 and stop timing device 5 when relay 46' is energized upon the entrance of ball 6 in the lower impedance change device 4.

The amount that the timing device 5 has been actuated during the travel of the ball 6 from the upper to the lower impedance change device will be a measure of the viscosity and said device 5 may be calibrated so that the indicator 63a thereon may directly indicate the viscosity on a scale 64.

The clock 5 is provided with a reset knob 65 and attendant mechanism (not shown) for resetting the indicator 63a to any predetermined position.

Other advantages of the aforedescribed apparatus will be apparent without further detail.

I am aware that many changes may be made without departing from the principles of my invention and I therefore do not wish to be limited to the details shown and described.

I claim:

1. In a system for timing the passing of a body between spaced points, a pair of spaced impedance change devices, each comprising a pair of spaced capacitor plates, oscillator means, including two output circuits, and controlled by one of said devices said means providing an on and off trigger-like impulse in one output circuit as said body passes between the plates of said device and controlled by the other one of said devices to provide a similar impulse in the other output circuit as said body passes between the plates of said other device, a relay adapted to be energized under the control of said first output circuit and provided with a switch, a time controlled device in circuit with said switch and adapted to be started upon the closing thereof and the energization of said relay, a latch adapted to hold said relay and switch closed to maintain said time controlled device on and an electro-magnet adapted to be energized under the control of the second output circuit and adapted to release said latch to open said switch.

2. In a system for timing the passing of a body between spaced points, a pair of spaced impedance change devices, each comprising a pair of spaced capacitor plates electronic means, including two output circuits, and controlled by one of said devices, said means providing an on and off trigger-like impulse in one output circuit as said body passes between the plates of said device and controlled by the other one of said devices to provide a similar impulse in the other output circuit as said body passes between the plates of said other device, a relay adapted to be energized under the control of said first output circuit and provided with a switch, a time controlled device in circuit with said switch adapted to be started upon the closing thereof and the energization of said relay, a latch adapted to hold said relay and switch closed to maintain said time controlled device on and an electro-magnet adapted to be energized under the control of the second output circuit and adapted to release said latch to open said switch.

3. In a system for timing the passing of a body between spaced points, a pair of spaced impedance change devices, each comprising a pair of spaced capacitor plates, a pair of oscillator circuits spaced a substantial distance from said devices, each provided with an oscillating circuit mechanically mounted in proximity to a corresponding one of said devices and operatively connected thereto for control thereby, each of said first circuits including a grid circuit, a concentric conductor cable having its central conductor and sheath connected between terminals of each of said second circuits and the grid circuit of a corresponding one of said first circuits and a time controlled device controlled by said oscillator circuits to measure the time consumed by said body in traveling between said devices.

THEODORE A. COHEN.

REFERENCES CITED

The following references are of record in the file of this patent:

UNITED STATES PATENTS

| Number | Name | Date |
|---|---|---|
| 1,526,337 | Hartley | Feb. 17, 1925 |
| 1,780,952 | Symmes | Nov. 11, 1930 |
| 2,034,658 | Jones et al. | Mar. 17, 1936 |
| 2,050,866 | Tamm | Aug. 11, 1936 |
| 2,154,376 | Cline | Apr. 11, 1939 |
| 2,175,173 | Batchelder | Oct. 10, 1939 |
| 2,252,572 | Lang | Aug. 12, 1941 |
| 2,255,266 | Moorefield | Sept. 9, 1941 |
| 1,994,706 | Hincks | Mar. 19, 1935 |

FOREIGN PATENTS

| Number | Country | Date |
|---|---|---|
| 385,265 | Great Britain | Mar. 13, 1930 |
| 317,477 | Great Britain | No date |